United States Patent [19]

Leslie

[11] Patent Number: 4,933,691

[45] Date of Patent: Jun. 12, 1990

[54] SURVEILLANCE CAMERA SUPPORT

[76] Inventor: Dennis R. Leslie, 9722 Rose Dr., Taylor, Mich. 48180

[21] Appl. No.: 295,057

[22] Filed: Jan. 9, 1989

[51] Int. Cl.$^5$ .............................................. G03B 29/00
[52] U.S. Cl. ...................................... 354/81; 354/293; 352/132; 352/243; 248/214; 248/283
[58] Field of Search ................... 354/81, 293; 352/132, 352/243; 248/214, 283

[56] References Cited

U.S. PATENT DOCUMENTS

| 488,608 | 12/1892 | Hotchkiss | 248/214 |
| 624,571 | 5/1899 | Strifler | 248/214 |
| 3,833,196 | 9/1974 | Protzman | 354/293 X |
| 4,309,099 | 1/1982 | Flint | 354/293 |
| 4,394,075 | 7/1983 | Brown et al. | 354/293 X |
| 4,569,579 | 2/1986 | Kangas | 354/293 |
| 4,615,597 | 10/1986 | Burriss | 354/293 |

Primary Examiner—L. T. Hix
Assistant Examiner—Brian W. Brown
Attorney, Agent, or Firm—Krass and Young

[57] ABSTRACT

A vehicular mounted support for cameras or other optical devices comprises a support pillar attachable to the window of the vehicle and having a spacer to steady the pillar in at least partially spaced-apart relationship with the window. The pillar supports a mounting arm which in turn holds a camera or other mounting device. The mounting arm is positionably adjustable with respect to the length of the support pillar and may be articulated to allow for a better positioning of the optical device.

18 Claims, 1 Drawing Sheet 4,933,691

SURVEILLANCE CAMERA SUPPORT

Field of the Invention

This invention relates generally to support devices for cameras or other optical equipment. The invention most specifically relates to a support which is configured to be mounted upon the window of a vehicle.

BACKGROUND OF THE INVENTION

Users of cameras, binoculars, telescopes or other such optical devices frequently find it necessary to steady these devices so as to prevent blurring of photographs and/or to obtain a clearer view. The need to study such devices is exacerbated when they are used under low light conditions or when they are used for long periods of time. For this reason, supports such as tripods and the like are standard accessories for such optical equipment.

Frequently, cameras or other optical equipment are used in conjunction with motor vehicles and in such instances it is impractical or impossible to properly utilize a tripod. Surveillance operations present one significant situation in which cameras or other such optical equipment is employed. Such operations are carried on by various law enforcement departments, governmental agencies or private investigators for purposes of gathering information. Surveillance operations generally invoke long-term observations and/or photography and are frequently carried out in low light situations. A great number of surveillance operations are conducted from a motor vehicle and hence there is a significant need for a vehicular mounted support which can be used to steady cameras, telescopes, binoculars, night vision devices and other such optical equipment.

The covert nature of surveillance operations mandates that any such support not be unduly obtrusive so as to avoid drawing attention to the surveillance vehicle. It is also important that such support device be reliable, rugged and simple to use. It is further desirable that a surveillance support allow use of the optical device supported thereby from the interior of a vehicle. This is an important consideration insofar as operations are frequently carried out in inclement weather and furthermore, exterior mounting of a camera or other such device would draw undue attention.

The prior art includes various devices for mounting cameras and the like onto motor vehicles. For example, U.S. Pat. No. 4,615,597 describes an exteriorly mounted table for supporting a motion picture camera. The apparatus of the '597 patent is described as being particularly well-suited for filming motion pictures of the driver or passengers of the vehicle, or for filming the passing scenery. The camera mount of this type is unsuited for surveillance operations insofar as it is a highly obtrusive device, mounted on the exterior of a motor vehicle and furthermore does not permit access to the camera from within the vehicle.

U.S. Pat. No. 3,833,196 describes a camera support which mounts upon the window of a motor vehicle. This support permits use of the camera from within the vehicle, however it requires the window to be lowered and furthermore causes the camera to project from within the vehicle during use. U.S. Pat. No. 4,569,579 depicts another window-mounted camera support. This support clamps onto the pane of glass, however it also causes the camera to project from the vehicle and furthermore requires substantial lowering of the window for use.

It will appreciated from the foregoing that there is a need for a mounting device for supporting a camera or other such optical apparatus within the interior of a motor vehicle. It is further desired that such support not require significant lowering of the vehicle window and not present an obtrusive exterior profile.

The present invention, as will be described in greater detail hereinbelow, encompasses a support for optical devices which allows those devices to be utilized from within the interior of a vehicle, while allowing the vehicle's window to be substantially closed. The apparatus of the present invention is simple, rugged, reliable and presents a low profile of visibility. Accordingly, the support device of the present invention is particularly well-suited for use in conjunction with various surveillance operations, although it will be appreciated that its superior design and ease of operation will make it very useful for more conventional applications as well. These and other advantages of the present invention will be readily apparent from the drawings, discussion, description and claims which follow.

SUMMARY OF THE INVENTION

There is disclosed herein apparatus for supporting an optical device upon a window of a motor vehicle. The apparatus comprises a generally elongated support pillar having attachment means associated with the topmost end thereof for engaging the edge of a pane of a vehicular window so as to support the pillar thereupon. The apparatus further includes spacer means affixed to the support pillar and including at least one generally elongated member projecting horizontally from the pillar. The projecting member has one end configured to contact the window pane and it supports and steadies the pillar in an at least a partially spaced relationship from the pane. The apparatus further includes a mounting arm affixed to the pillar so as to be adjustable with respect to the length of the pillar.

In more particular embodiments, the spacer means includes two threaded rods projecting from the pillar for maintaining the pillar in an approximately vertical relationship with the window. The rods may have elastomeric coatings on the ends which contact the window. In some instances, the rods may include rollers on the ends thereof and the pillar may be affixed to the window by a hook or similar device including a roller. In this manner, the entire support may be slid along the length of the window.

The mounting arm will in some instances be articulated so as to allow for better positioning of the camera or other optical device within the vehicle and may include lockable articulating joints to provide a steady support once adjustment is achieved.

In some instances, the pillar includes a number of holes along the length thereof and the mounting arm includes a channel which engages the length of the pillar. In such instance, the position of the mounting arm along the pillar may be adjusted by means of a locking pin inserted in the holes.

DETAILED DESCRIPTION OF THE INVENTION

Figure 1:
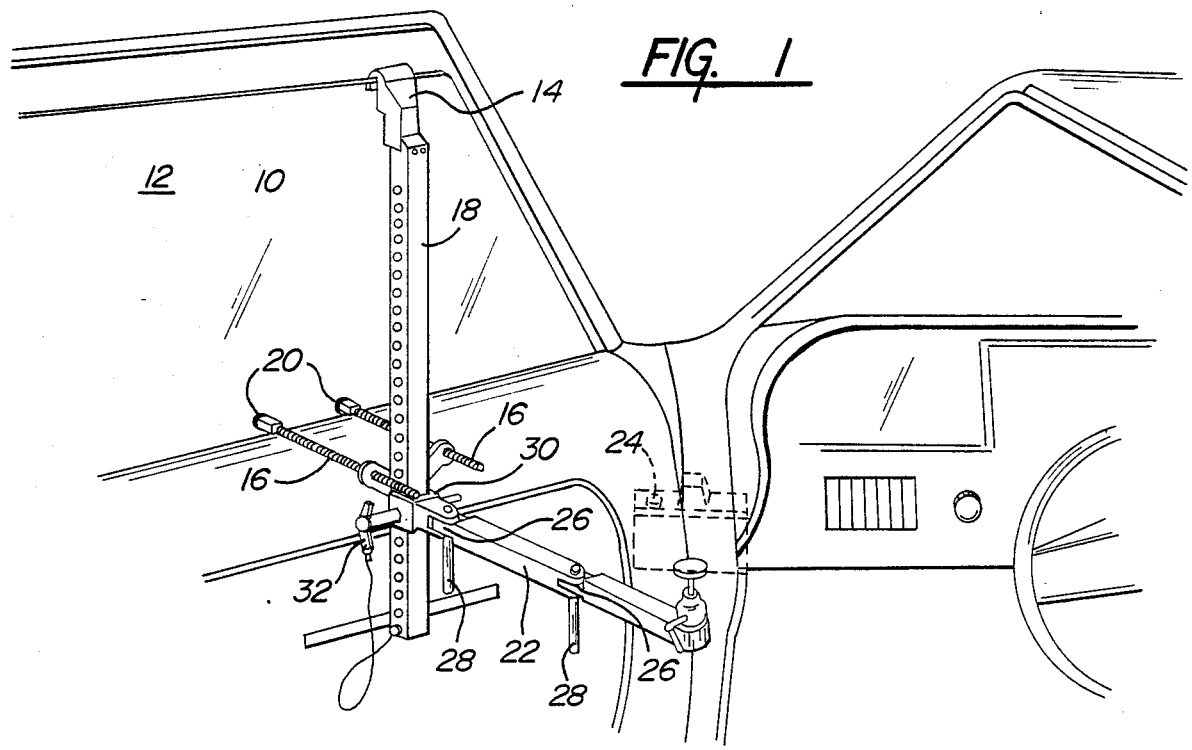
FIG. 1 is a perspective view of the surveillance support of the present invention showing it as mounted upon the window of a motor vehicle.

Referring now to FIG. 1, there is shown a perspective view of one embodiment of surveillance support 10 structured in accord with the principles of the present invention as utilized to mount a camera within a motor vehicle. As shown in the figure, the support 10 comprises a support pillar 18 having a hook-shaped attachment member 14 on the topmost end thereof. The attachment member 14 secures the support pillar 18 and hence the entire assembly 10 to the topmost portion of a vehicular window pane 12.

The surveillance support 10 further includes a pair of spacer members 16 affixed on one end thereof to the support member and operative to contact the window pane 12 and steady the support pillar 18 in an at least partially spaced apart relationship with the window pane 12. As will be noted from the figure, the spacers 16 include a threaded portion so as to allow for adjustment for their length and hence accommodate various curvatures of windows. The end of the spacers 16 distal the support pillar 18 will generally be particularly configured to contact the window pane 12. Toward this end, the spacer 16 may include an elastomeric coating or member on the window contacting end thereof so as to prevent scratching or other damage to the window. As illustrated in FIG. 1, the window contacting portion of the spacers 16 includes rollers 20. These rollers 20 are preferably fabricated from rubber, plastic or other such elastomeric material and allow for ready adjustment of the support 10 along the length of the window. It has been found advantageous in some instances and also include one or more rollers in the hook-shaped attachment member 14 so as to permit still better slidable adjustment of the support 10 along the length of a window 10. An embodiment of this type is particularly well-suited for use in vans or other vehicles having relatively long windows.

The support further includes a mounting arm 22 for retaining a camera (shown in phantom outline at 24), or other such optical device. The mounting arm 22 may be a single unitary member, or as depicted in this embodiment may comprise an articulated member. By the inclusion of articulation joints, positioning of optical equipment within the vehicle is facilitated. In the particular embodiment of FIG. 1, the mounting arm 22 includes two articulated joints 26 each having associated therewith a combination handle and immobilizer 28, which will be described in greater detail hereinbelow.

The mounting arm 22 is adjustable with regard to the length of the support pillar 18 and toward that end includes a channel portion 30 configured to engage a portion of the cross section of the pillar 18 so as to permit the arm 22 to slide therealong. This channel portion may be U-shaped, or of square cross section to enable it to be slid along the pillar 18. It will be noted that the pillar 18 includes a number of holes therethrough and that the channel 30 also includes a hole. In this manner, a locking pin 32 may be inserted to retain the mounting arm in a fixed position along the support pillar 18.

Figure 2:
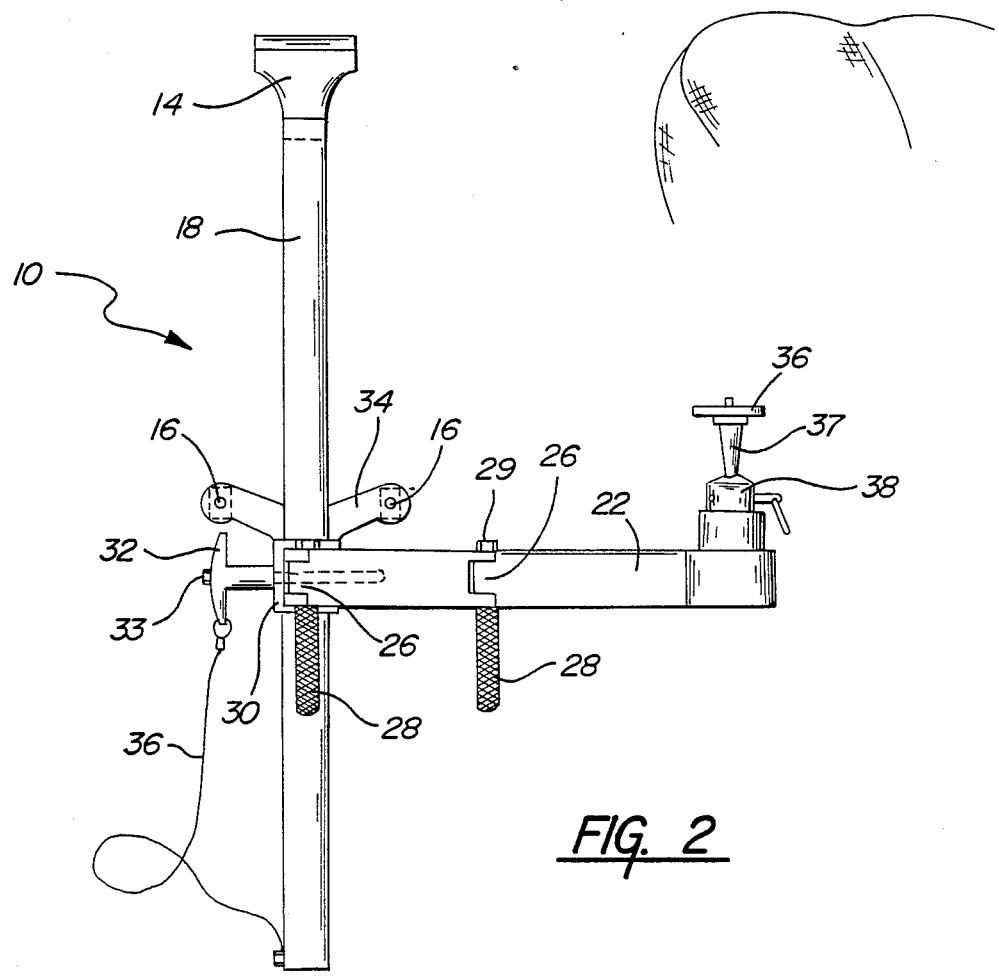
FIG. 2 is a front elevational view of one particular surveillance support structured in accord with the principles of the present invention and depicting the components thereof.

Referring now to FIG. 2, there is a shown a front elevational view of the surveillance support 10 illustrating the pillar 18, and the hook-shaped attachment member 14. The two spacers 16 are shown in end view and better illustrated herewith, is the manner in which they are mounted to the support 10. As shown in this embodiment, the spacers 16 are threaded into a spacer support bracket 34 which, in this embodiment is attached to the channel 30 of the mounting arm 22. Obviously, other arrangements are contemplated by the present invention. For example, the spacer support bracket 34 may be permanently affixed to the support pillar 18 or may be separately mounted thereto in an adjustable relationship.

The mounting arm 22 includes a universal camera mount 36, said term being understood in the photographic art to refer to a screw mount which is standard to most cameras presently manufactured. The universal mount 36 is, in this embodiment, affixed to a pedestal 37 which is joined to the mounting arm 22 by means of a selectively immobilizable ball joint 38. In this manner, a camera may be readily attached to the mount 36 and appropriately positioned by the use of the ball joint 38. Obviously, other mounts may be similarly affixed to the mounting arm 22 so as to accommodate other types of cameras or other apparatus. The choice of mount will obviously depend upon the equipment utilized in conjunction with the support of the present invention. It is contemplated that one of skill in the art could readily select some various mounting brackets available to support binoculars, telescopes and the like. It is further contemplated that the mounting arm of the present invention be configured to interchangeably receive and retain a variety of mounting devices.

As mentioned hereinabove, it is preferable that the mounting arm 22 be articulated so as to allow for ready positioning of an optical device within the vehicle. Toward that end, the mounting arm 22 of the FIG. 1 and FIG. 2 embodiments includes two articulated joints 26 therein, said joints configured as hinge-like joints to allow for adjustment in one plane of motion. As shown herein, the joint 26 includes a combination hinge pin-handle for immobilization thereof. The joint is immobilized for coaction of a bolt 29, which forms the pin of the hinge and a handle portion 28 which is threaded to receive the bolt. By twisting the handle 28 the bolt is selectively loosened or tightened so as to free or affix the articulated joint 26.

As was discussed with reference to FIG. 1, the mounting arm 22 may be positioned along the length of the support pillar 18 by sliding and may be affixed in position by a locking pin 32. As is better shown in FIG. 2, the locking pin passes through a hole in the channel 30 in the mounting arm 22 and a hole in the support pillar 18 to affix the arm and pillar. Locking pins of this type are well-known and available in the art and generally comprise a pin having a spring loaded detent such as a ball on one end thereof. By depressing a detent control button 33, the detent is released and the pin may be inserted or withdrawn. As is shown in this figure, the locking pin 32 is affixed to the support pillar 18 by a short length of cable 36, to prevent loss thereof.

There are a variety of materials which may be employed for the manufacture of the surveillance support of the present invention. It has generally been found that metals, as well as engineering plastics will give sufficient strength and stability to the unit. In one particular embodiment, it has been found that the attachment hook 14 is most advantageously fabricated from a high strength plastic such as nylon, delrin, or the like so as to prevent damage to the vehicular window. The remainder of the unit is most advantageously fabricated from aluminum or other such metal and is preferably provided with a dark, non-glare finish.

The support unit of the present invention allows for ready positioning of a camera or other device within the interior of a vehicle. Because of the design of the support, the window of the vehicle need only be open a relatively small amount, sufficient to accommodate the hook-shaped attachment member 14. It will be appreciated that by proper hook design, this space may be made very small, thereby protecting the person utilizing the optical device from the external environment. It should also be pointed out that if necessary, the surveillance support of the present invention may be disposed on the exterior of the vehicle window; the adjustability of the spacer 16 allows for such ready reconfiguration.

It will be appreciated that in light of the foregoing drawings, discussion and description, many variations of the present invention may be realized. For example, various other attachments may be utilized to provide for the adjustable affixation of the mounting arm to the support pillar. Such variations might include compression sleeves and the like. Similarly, the pillar, although depicted as being of square cross section, may be fabricated as a cylindrical member. The articulation joints may comprise ball and socket type joints which would allow for three-dimensional repositioning of the support arm. In some instances, the mounting arm may include a greater or lesser number of articulation joints and may possibly dispense with articulation joints entirely.

In light of the foregoing, it will be appreciated that the drawings, discussion and description herein are merely meant to illustrate particular embodiments of the present invention and are not meant to be limitations upon the practice thereof. It is the following claims, including equivalents, which define the scope of the invention.

I claim:
1. Apparatus for supporting an optical device upon a window of a motor vehicle, said support comprising:
   (A) a generally elongated support pillar having attachment means associated with a first and thereof, said attachment means operative to engage the topmost edge of the pane of the vehicular window so as to support the pillar thereupon;
   (B) spacer means affixed to said support pillar and including at least one generally elongated member projecting generally horizontally from said pillar and having the end thereof distal said pillar configured to contact the window pane, whereby said spacer means steadies said pillar in an at least partially spaced apart relationship with said pane;
   (C) a mounting arm adjustably affixed to said pillar and including therewith mounting means for affixing said optical device thereto; and
   (D) adjustment means associated with said pillar and mounting arm for providing for the positioning of the arm along at least a portion of the length of the pillar.

2. Apparatus as in claim wherein the attachment means associated with the pillar comprises a hook-like member configured to engage the edge of the window pane.

3. Apparatus as in claim 1, wherein said attachment means associated with the pillar includes a roller disposed so as to permit said pillar to.be slid along the length of the edge of the window pane.

4. An apparatus as in claim 1, wherein the at least one generally elongated member of the spacer means is horizontally adjustable with regard to the pillar so that the length projecting from said pillar may be selectably varied.

5. An apparatus as in claim 4, wherein said at least one generally elongated member includes a screw threaded portion for adjusting the length thereof which projects from the pillar.

6. An apparatus as in claim 1, wherein said spacer means includes two generally elongated members projecting generally horizontally from the pillar.

7. Apparatus as in claim 1, wherein the window contacting end of said at least one elongated member includes an elastomeric cushion thereupon.

8. Apparatus as in claim 1, wherein said window contacting end of said at least one elongated member includes a roller thereupon.

9. Apparatus as in claim 1, wherein said spacer means is adjustably affixed to the support pillar together with the mounting arm.

10. Apparatus as in claim 1, wherein the mounting means associated with the mounting arm comprises a universal camera mount.

11. Apparatus as in claim 10, wherein said universal mount includes a ball joint.

12. Apparatus as in claim 1, wherein said mounting arm includes an articulated joint.

13. Apparatus as in claim 1, wherein said mounting arm includes two articulated joints.

14. Apparatus as in claim 12, wherein said mounting arm included means for immobilizing the articulation.

15. Apparatus as in claim 1, wherein said support pillar included a plurality of holes along the length thereof and wherein said mounting arm includes a channel portion configured to engage at least a portion of the cross section of the pillar so as to permit the mounting arm to be slid along the length thereof.

16. Apparatus as in claim 15, wherein said adjustment means comprises a locking pin configured to be retainably received within the holes in the support pillar.

17. Apparatus as in claim 16, wherein said channel portion of the mounting arm includes a hole configured to receive said locking pin, whereby said attachment arm may be adjustably affixed to the pillar by inserting a locking pin through the hole in the channel and into the hole in the pillar.

18. Apparatus for supporting an optical device upon a window of a motor vehicle, said support comprising:
   (A) a generally elongated support pillar having an attachment hook on one end thereof, said hook configured to engage the topmost edge of the pane of the window so as to support the pillar thereupon, said pillar further including a plurality of holes defined therein disposed in spaced apart relationship along the length thereof;
   (B) a pair of spacer members, each comprising a generally rod-like member having a threaded portion cooperating with a correspondingly threaded socket for affixing said spacer member to the support pillar so that said spacer member projects generally horizontally from said pillar, said spacer members operative to contact the surface of the window pane and to steady the pillar in an at least partially spaced apart relationship with the pane;
   (C) a mounting arm including a channel portion disposed at a first end thereof for slidably affixing said arm to the pillar, said channel portion including a hole defined therein and disposed so as to align with at least one of the plurality of holes in the pillar as the arm is slid therealong, said arm further including at least one selectively immobilizable articulated joint and optical device mounting means disposed proximate a second end thereof; and (D) a locking pin configured to pass through the hole in the channel portion of the mounting arm and one of said plurality of holes in the pillar so as to affix the mounting arm to the pillar.

* * * * *

UNITED STATES PATENT AND TRADEMARK OFFICE
CERTIFICATE OF CORRECTION

PATENT NO. : 4,933,691
DATED : June 12, 1990
INVENTOR(S) : Dennis R. Leslie

It is certified that error appears in the above-identified patent and that said Letters Patent is hereby corrected as shown below:

Column 1, line 29, "invoke" should be --involve--.

Column 5, line 59, "claim wherein" should be --claim 1, wherein--.

Signed and Sealed this

Fourteenth Day of May, 1991

Attest:

HARRY F. MANBECK, JR.

Attesting Officer  Commissioner of Patents and Trademarks